United States Patent
Horgan (10) Patent No.: US 9,552,246 B2
(45) Date of Patent: Jan. 24, 2017

(54) OUT-OF-BAND MONITORING AND MANAGING OF SELF-SERVICE TERMINALS (SSTS)

(71) Applicant: NCR Corporation, Duluth, GA (US)

(72) Inventor: Kevin Horgan, Dundee (GB)

(73) Assignee: NCR Corporation, Duluth, GA (US)

( * ) Notice: Subject to any disclaimer, the term of this patent is extended or adjusted under 35 U.S.C. 154(b) by 131 days.

(21) Appl. No.: 14/169,537

(22) Filed: Jan. 31, 2014

(65) Prior Publication Data
US 2015/0220381 A1 Aug. 6, 2015

(51) Int. Cl.
| G06F 11/00 | (2006.01) |
| G06F 11/07 | (2006.01) |
| G07F 17/32 | (2006.01) |
| G07F 9/02 | (2006.01) |
| G06Q 10/00 | (2012.01) |
| H04L 29/06 | (2006.01) |

(52) U.S. Cl.
CPC ....... *G06F 11/0772* (2013.01); *G06F 11/0748* (2013.01); *G06F 11/0769* (2013.01); *G06Q 10/20* (2013.01); *G07F 9/026* (2013.01); *G07F 17/3234* (2013.01); *H04L 63/08* (2013.01)

(58) Field of Classification Search
CPC .................................................. G06F 11/0772
See application file for complete search history.

(56) References Cited

U.S. PATENT DOCUMENTS

| 7,077,312 | B2 * | 7/2006 | Putman | G06Q 20/108 235/379 |
| 7,181,501 | B2 | 2/2007 | Defosse | |
| 8,118,215 | B2 * | 2/2012 | Coventry | G06Q 20/1085 235/379 |
| 2006/0169764 | A1 * | 8/2006 | Ross | G07F 19/20 235/375 |
| 2009/0083182 | A1 * | 3/2009 | Coventry | G06Q 20/1085 705/43 |
| 2009/0299800 | A1 * | 12/2009 | Neilan | G06Q 10/06 705/7.26 |
| 2011/0238572 | A1 * | 9/2011 | McGraw, IV | G06Q 20/10 705/43 |
| 2011/0296194 | A1 * | 12/2011 | Herkes | G06F 21/34 713/185 |
| 2012/0160913 | A1 * | 6/2012 | Shepley | G07F 19/20 235/379 |

FOREIGN PATENT DOCUMENTS

| EP | 1638057 A1 | 3/2006 |
| GB | 2351594 A | 1/2001 |

* cited by examiner

*Primary Examiner* — Christopher McCarthy
(74) *Attorney, Agent, or Firm* — Schwegman, Lundberg & Woessner (57) ABSTRACT

A portable memory device is interfaced to a SST and authenticated; a system application on the SST writes diagnostic data to the device. The portable memory device is subsequently interfaced to an enterprise system and the diagnostic data is pulled to the enterprise system for analysis. In an embodiment, the enterprise system pushes informational data regarding maintenance and support to the portable device when the portable device is subsequently interfaced to the SST; the informational data is pushed to the SST for presentation and viewing by a service engineer.

2 Claims, 4 Drawing Sheets

OUT-OF-BAND MONITORING AND MANAGING OF SELF-SERVICE TERMINALS (SSTS)

BACKGROUND

Increasingly, enterprises are deploying Self-Service Terminals (SSTs) at various locations for use by consumers. The locations can include financial institutions, grocery stores, retail stores, government venues, entertainment venues, gaming venues, transportation venues, and the like.

The SSTs save the enterprises money by reducing onsite support staff and increasing the operational throughput by servicing consumers more efficiently.

However, the SSTs are electromechanical devices that include a variety of hardware and software modules, which do fail on occasion requiring onsite service. Moreover, the SSTs can, from time-to-time, require new modules, updated modules, or require that some modules been removed from the SSTs. Thus, a support staff of service engineers/technicians must be maintained by the enterprises.

Moreover, some SSTs lack any network connection, such that remote monitoring and management becomes problematic, such as a typical vending machine. While other SSTs have very restrictive and secure network connections due to the very nature of the business associated with these SSTs, such as an Automated Teller Machine (ATM). For example, ATM networks may be owned and operated by one company for security reasons while a different company manages and services the ATM. This means that the servicing company for the ATM has limited and in some cases no access to the ATM's network for supporting the ATM.

Thus, remote network monitoring and maintenance of some SSTs is problematic for an enterprise. Moreover, even when an enterprise relies on its service engineers in the field to report back issues (however insignificant), the information for those issues is often: incomplete, misleading, or in some cases even completely missing (a service engineer neglects to report the information). So, monitoring and managing a particular SST is inefficient and obtaining a system wide perspective on all SSTs serviced by the enterprise becomes a next to impossible feat.

SUMMARY

In various embodiments, methods and systems for out-of-band monitoring and management of Self-Service Terminal (SSTs) are presented.

According to an embodiment, a method for out-of-band monitoring and management of SSTs is provided. Specifically, a connection to a SST that is made by a portable memory device is detected. Next, a background process is executed to write terminal information related to operation metrics of the SST to the portable memory device as a service engineer interacts with an interface of the SST. The portable memory device is subsequently interfaced to a different processing device that utilizes a network connection to connect to a server and provide the operational metrics for analysis without interaction of the service engineer.

DETAILED DESCRIPTION

Figure 1:
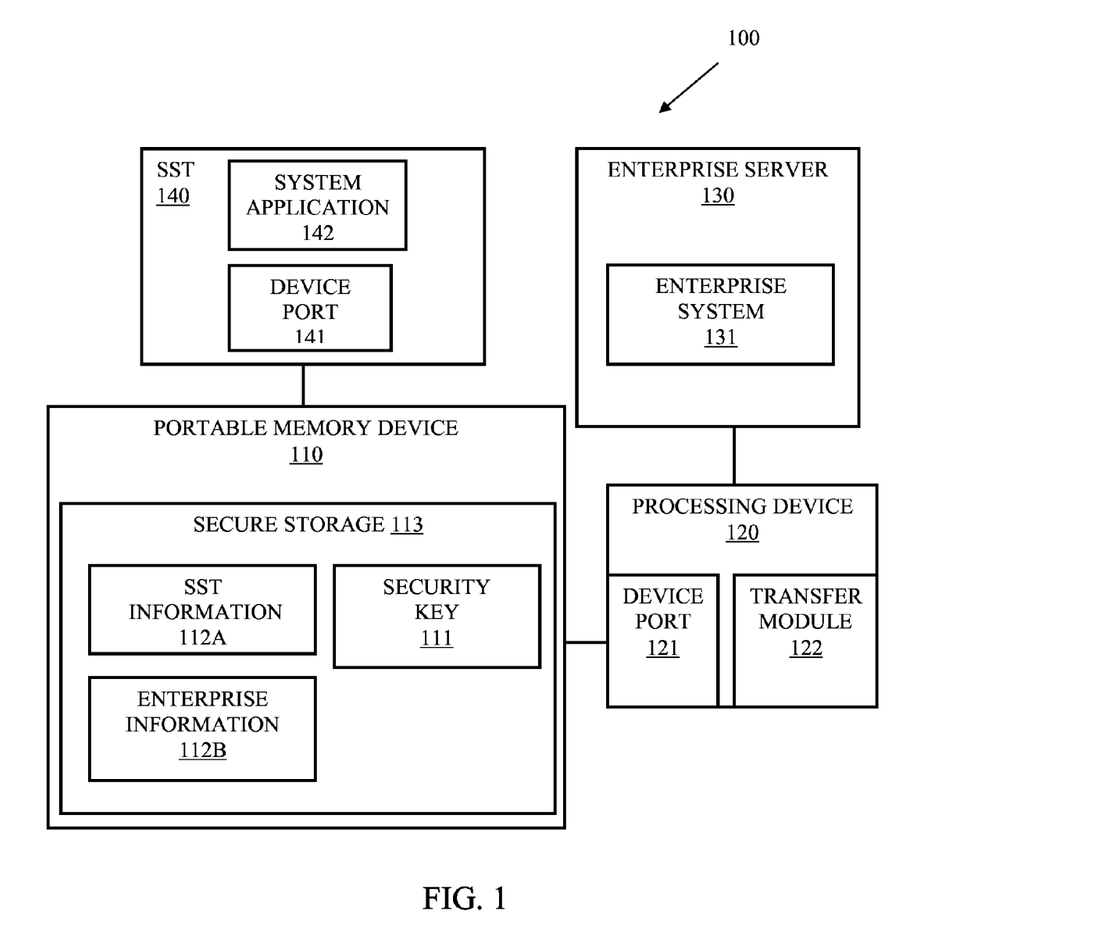
FIG. 1 is a diagram of an example architecture for practicing out-of-band monitoring and managing of Self-Service Terminal (SSTs), according to an example embodiment.

FIG. 1 is a diagram of an example architecture 100 for practicing out-of-band monitoring and managing of Self-Service Terminal (SSTs), according to an example embodiment. It is to be noted that the SST 140 is shown schematically in greatly simplified form, with only those components relevant to understanding of this embodiment being illustrated. The same situation is true for the portable memory device 110, the processing device 120, and the enterprise service 140. The various components of the SST 140, the portable memory device 110, the processing device 120, and the enterprise server 130 not depicted would be readily appreciated and understood by one of ordinary skill the art.

Furthermore, the various components (that are identified in the FIG. 1) are illustrated and the arrangement of the components is presented for purposes of illustration only. It is to be noted that other arrangements with more or less components are possible without departing from the out-of-band monitoring and managing of SSTs presented herein and below.

The methods and system presented herein and below for out-of-band monitoring and managing of SSTs can be implemented in whole or in part in one, all, or some combination of the components shown with the architecture 100. The methods and system are programmed as executable instructions in memory and/or non-transitory computer-readable storage media and executed on one or more processors associated with the components.

Specifically, the architecture 100 permits out-of-band monitoring and managing of a SST 140 utilizing a portable memory device 110 to transfer information to and from the SST 140 and transfer information to and from an enterprise server 130 (using the enterprise system 131) and through a processing device 120. The details of this approach and in view of the components within the architecture 100 are now presented with reference to an embodiment of the FIG. 1 within the context of ATM maintenance and support systems, where the SST 140 is referred to as an ATM 140 and the portable memory device 110 is a secure Universal Serial Bus (USB) device 120.

Furthermore, the phrase "out-of-band" refers to electronic communications that occur outside traditional network communications for an ATM 140.

However, before discussion of the architecture is presented, it is to be noted that the methods and system presented herein are not limited to ATM solutions; that is, any SST terminal (kiosk, vending machine, check-in and/or check-out terminal, such as those used in retail, hotel, car rental, healthcare, or financial industries, etc.) for any industry can benefit from the out-of-band managing mechanisms discussed herein, including SSTs that lack a network connection entirely, such as some vending machines.

The architecture 100 includes a USB device 110, a processing device 120, an enterprise server 130, and an ATM 140. The USB device 110 includes: a security key 111, ATM information 112A, and enterprise information 112B (all residing in secure storage 113 of the USB device 110). The processing device 120 (which in this embodiment is a laptop personal computer) includes a device port 121 (which in this embodiment is a USB port) and a transfer software module 122). The enterprise server 130 includes an enterprise system 131. The ATM 140 includes a device port 141 (in the form of a USB port in this embodiment) and a system application 142 (which includes a secure storage 113).

The USB device 110 is a USB key dongle. Although, it is noted that the portable memory device 110, in other embodiments, can be any device having memory that can be accessed when interfaced to the ATM 140. For example, the portable memory device 110 can be a smart phone, a memory stick, a Secure Digital (SD) card, a tablet, a laptop personal computer, or a wearable processing device having a secure mechanism to authenticate using the security key 111 and securely push and pull the information 112 from the ATM 140, or securely push and pull the information 112 from the enterprise system 131 utilizing the processing device 120.

The USB key dongle 110 includes secure storage 113 for storing a security key 111, ATM information 112, and enterprise information 112B (112A and 112B discussed more completely below). Moreover, in an embodiment the USB key dongle 110 includes a mechanism (not depicted in the FIG. 1) that permits authentication of the USB key dongle 110 with the ATM 140 using the security key 111 and an identifier associated with the USB key dongle 110 in order to permit a service engineer to access an administrative interface (a graphical or text-based interface not shown in ATM 140) to access functions of the system application 142).

For the present embodiment, the processing device 110 is a laptop personal computer 110. However, it is to be noted that the processing device 120 is any device capable of storing and processing data having networking capabilities to connect to the enterprise server 130. So, the processing device can be: a tablet, a laptop, a smartphone, a wearable processing device, and the like.

Moreover, the laptop personal computer 120 includes a USB port 121 capable of interfacing the USB key dongle 110. For purposes of the discussion and examples that follow within the context of ATM maintenance and support, the processing device 120 is a laptop 120. However, in other embodiments, the device port 121 can be any other wired or wireless device port.

The laptop personal computer 120 also includes a transfer software module 122 for interacting with the enterprise system 131. The transfer software module 122 is configured to establish an automatic connection with the enterprise system 131 when the USB key dongle 110 is interfaced to the USB port 121 and the laptop personal computer 120 has or is capable of obtaining a network connection (wired or wireless). This is done without input on the part of the service engineer; although it is noted in some instances the connection between the personal laptop computer 120 and the enterprise system 131 can be achieved via an interface (graphical or text-based interface not shown in the FIG. 1) associated with the transfer software module 122 that the service engineer activates and interacts with to establish the connection.

The enterprise server 130 is a processing environment that executes and provides access to the laptop personal computer 120 through the enterprise system 131. The enterprise server 130 can be a secure cloud environment that spans multiple physical locations and creates a single logical processing environment that represents the enterprise server 130. In another case, the enterprise server 130 is any server located at a specific physical location operated by an enterprise.

The enterprise server 130 includes an existing enterprise system that monitors and manages ATMs (can manage other types of SSTs in other embodiments); the existing enterprise system 130 is modified to include the features discussed herein and is the enterprise system 131 depicted in the FIG. 1.

During operation of the components of the architecture 100 (within the context of ATM solutions for the present embodiments), a service engineer employed/contracted by an enterprise is in possession of and operates the USB key dongle 110 and the laptop personal computer 120. The service engineer utilizes the USB key dongle 110 and the laptop personal computer 120 to make connections to the ATM 140 and to the enterprise server 130. For purposes of the discussion, these connections occur at separate points in time when the USB key dongle 110 is being utilized by the service engineer. It is noted, that the connection to the enterprise server 130, via the laptop personal computer 120 (with the USB key dongle 110 interfaced to the USB port 121), can occur before or after the service engineer connects to the ATM 140 (via USB port 141). Similarly, the connection of the USB key dongle 110 to the ATM 140 can occur before or after the laptop personal computer 120 connects to the enterprise server 130 using the transfer software module 122. A service engineer may connect the USB key dongle 110 to the laptop personal computer 120 at the start of his/her day, may connect to one or more ATMs to maintain those ATMs, and then may connect to the laptop personal computer 120 at the close of his/her day.

When the service engineer connects to the enterprise server 130 to interface with the enterprise system 131, the USB key dongle 110 is interfaced to the USB port 121 of the laptop personal 120. The transfer software module 122 (which is secure and executes some functions in kernel mode and other functions in user mode of an Operating System (OS) of the laptop personal computer 121) validates the USB key dongle 110 and connects the laptop personal computer 120 to the enterprise server 130, and then activates the enterprise system 131. At this point, or just after the USB key dongle 110 is coupled to USB port 121, the service engineer may be required to provide credentials to authenticate himself/herself.

This establishes the connection between the laptop personal computer 120 and the enterprise server 130. Some features that the enterprise system 131 performs on the laptop personal computer 120 may be visible and capable of being interacted with by the service engineer utilizing various aspects of the transfer software module 122.

Other features that the enterprise system 131 performs on the laptop personal computer 120 are invisible (transparent) to the service engineer utilizing portions of the transfer software module 122. For instance, the enterprise system 131 may renew the security key 111 on the USB device 110.

A particular and novel feature performed by the enterprise system 131 during the connection with the laptop personal computer 120 is to push enterprise information 112B to the USB key dongle 110 or pull ATM information 112A that exists on the USB key dongle 110 from the USB key dongle 110. In some embodiments, the transfer software module 122 of the laptop personal computer 120 pushes the ATM information 112A from the USB key dongle 110 to the enterprise system 131 and, may request a pull of (or receive a push from) the enterprise information available to the service engineer for the enterprise system 131, which is then written to the USB key dongle 110 as the enterprise information 112B.

ATM information 112A may include data representing operational metrics captured by the USB key dongle 110 when it was connected to the ATM 140 (referred to as "ATM operational information"). Such ATM operational information may include, but is not limited to: performance metrics for the ATM 140 (such as percentage of uptime (or percentage of downtime), specific device issues that the ATM 140 is configured to trap and log, details of a number of transactions performed, transaction information, software inventory lists, ATM 140 identifier, last service date and time, last reboot date and time, number of faults, contents of device logs of the ATM 140, and tallies (for example, number of printer operations performed by a print head, number of pick operations performed by a pick unit in a currency dispenser, and the like) of the ATM 140, and others.

Any enterprise information 112B written to the USB key dongle 110 may include data that the enterprise wants the service engineer to know or have access to (referred to as "service engineer alerts"). Such service engineer alerts may include, but is not limited to: tips of the day that the enterprise wants the service engineer to know about, recent regional frauds, operations to be performed on the ATM 140 or on all ATMs serviced by the enterprise, and other data that the enterprise deems relevant for the service engineer to know or have access to. The service engineer alerts may be different depending on the configuration of the ATM 140, so that an ATM 140 only presents the enterprise information 112B to the service engineer if the service engineer alerts are relevant to that ATM 140. This can be achieved by including an ATM identifier with the service engineer alerts so that if the ATM 140 does not have an ATM identifier matching the ATM identifier in the enterprise information 112B then the associated service engineer alerts are not displayed by that ATM 140.

It should be appreciated that the ATM information 112A and enterprise information 112B permit the enterprise to achieve out-of-band monitoring and management of the ATM 140, since no remote management software utility is needed to acquire the ATM information 112A and enterprise information 112B via the ATM's existing network connection. Moreover, the enterprise can acquire information 112A and 112B from all its managed ATM's worldwide (as the case may be—and even if those ATMs are owned and operated by different competitor banks) and use manual and/or automated analysis mechanisms to identify support issues with all ATMs, subsets of ATMs, or a particular ATM, such as ATM 140. Graphical presentations of the information 112A and 112B may also be utilized to visualize and analyze the information 112A and 112B as well. In fact, the enterprise can utilize the information 112A and 112B captured out-of-band for any purpose desired by the enterprise. The information 112A and 112B may be anonymized prior to being presented so that owner of the ATM 140 is not identifiable from the information 112A and 112B, just a type of ATM, the configuration of the ATM 140, and the like.

Moreover, and as will be discussed below the service engineer is entirely unaware (in the sense of not having to do any additional tasks to initiate or complete the transfers of information 112A and 112B; however, the status of any transfer, or the fact that a transfer has occurred, may be provided to the service engineer—although in some embodiments, even this type of status information may be hidden from the service engineer) of the fact that the information 112A was captured by the USB key dongle 110 during a connection to the ATM 140 and unaware of the fact that the information 112B was acquired by the enterprise system 131 during a connection to the enterprise server 130.

The enterprise may require that the service engineer make the connection to the enterprise server 130 on a daily basis, weekly basis, or any desired time interval deemed appropriate by the enterprise for efficient monitoring and management of the enterprise's ATMs.

When the service engineer connects to the ATM 140, the service engineer interfaces the USB key dongle 110 to the USB port 141 of the ATM 140. The system application 142 detects this and performs authentication. In an embodiment, the system application 142 encrypts a message that is sent to the USB key dongle 110. The USB key dongle 110 utilizing a cryptographic processor (not shown in the FIG. 1) on the USB key dongle 110 decrypts the message using the security key 111 and sends a response message back to the system application 142 (utilizing an Application Programming Interface (API) associated with communicating to the USB key dongle 110. This permits one form of authentication and activates an administrative interface on a display (not shown in the FIG. 1) of the ATM 140 for the service engineer to interact with and perform whatever task the service engineer is attempting to do at the ATM 140.

Once the authentication is achieved, the novel features presented herein of the system application 142 are activated, some of which the service engineer may be aware of (such as service engineer alert information) and can affirmatively select and some of which the service engineer is unaware of.

Initially, once the connection is made and authenticated, the system application 142 send a request to the USB key dongle 110 to receive information 112B, if any is present, from the USB key dongle 110. Assuming, information 112B is present, the USB key dongle 110 returns that information 112B to the system application 142 for handling. The returned information 112B is then made available in memory of the ATM 140 for use by the system application 142. In an embodiment, the request identifies a specific storage location (or offset from a starting storage location) where the system application 142 is configured to expect information 112B to be located within the secure storage 113 of the USB key dongle 110. In another embodiment, the system application 142 formulates the request to look for a specific file (assuming file system access is available from the USB key dongle 110); here, the system application 142 is configured to look for a specific file within the secure storage 113.

In an embodiment, the system application 142 presents the enterprise information 112B on a display (not shown in the FIG. 1) when also displaying diagnostic data from the ATM 140. The user interface presented by the system application 142 may be modified to present a continue button to the service engineer to force him/her to select it to move on from the presentation of the enterprise information 112B.

Alternatively, the system application 142 presents the enterprise information 112B once loaded to memory on the display (or one of the displays, that is, the service engineer display, where there is also a customer display present on the ATM 140) of the ATM 140. In another case, the interface screens of the system application 142 overlay a different screen having a button that the service engineer can activate to view the enterprise information 112B.

In an embodiment, when the enterprise information 112B identifies a requirement that the service engineer perform some required operation, the system application 142 can record whether the service engineer actually performs such operation in the ATM information 112A. This may be implemented by the system application 142 pushing (writing) an indication that the required operation was performed to the USB key dongle 110 for subsequent communication to the enterprise system 131 when the service engineer connects to the enterprise server 130, discussed above. This can be achieved by the system application 142 identifying an instructions included in the enterprise information 112B (or in third type of information (not shown in the FIG. 1). Identification can be achieved via a flag or token placed in the enterprise information 112B that identifies the data that follows it (until a next separation character in the enterprise information or a closing token identifying an end to the instruction), such that the system application 142 can parse the instruction from other data included in the enterprise information 112B. Recordation as to whether the service engineer performed the required operation is unknown (not visible) to the service engineer. The enterprise information 112B presented to the service engineer is something the service engineer is obviously aware of, and in some embodiments the system application 142 may require the service engineer to confirm that he/she has read the information 112B by pressing a button on a user interface.

So, not only passive information 112A (and portions of 112B when instructions are present) can be passed to the system application 142 via the USB key dongle 110 but active information 112B (portions of 112B representing instructions) can also be passed that requires evaluation or execution by the system application 142. Similarly, the USB key dongle 110 allows two-way communication of information 112A between the ATM 140 and the enterprise system 131.

The system application 142 can be configured to write the information 112A to the USB device 110 at any point during the connection of the USB key dongle 110 to the ATM 140, such as at the start of the connection, at the end of the connection, during some event detected during the connection, and other points in time during the connection configured in the enterprise application of the enterprise system 131.

Capturing the ATM information 112A, in a manner that the service engineer is unaware of (subject to exceptions discussed above) and in manner defined by the enterprise (the types of data to be captured in the ATM information 112A is configured within the enterprise application of the enterprise system 131) removes the subjectivity, communication skills, and competency of the service engineering from this aspect of ATM 140 monitoring desired by the enterprise. This also alleviates the service engineer from accounting for the ATM information 112A to the enterprise based on policy or procedure. So, the ATM 140 monitoring tasks of an enterprise our improved based on what exists in the industry today.

Moreover, the communication and analysis of the enterprise information 112B (as described above) provides for efficient and improved support of ATMs serviced by an enterprise than has heretofore been achieved in the industry.

Further, the improved monitoring and management are achieved via out-of-band communications with the ATM 140 and the enterprise, via the enterprise server 130.

Figure 2:
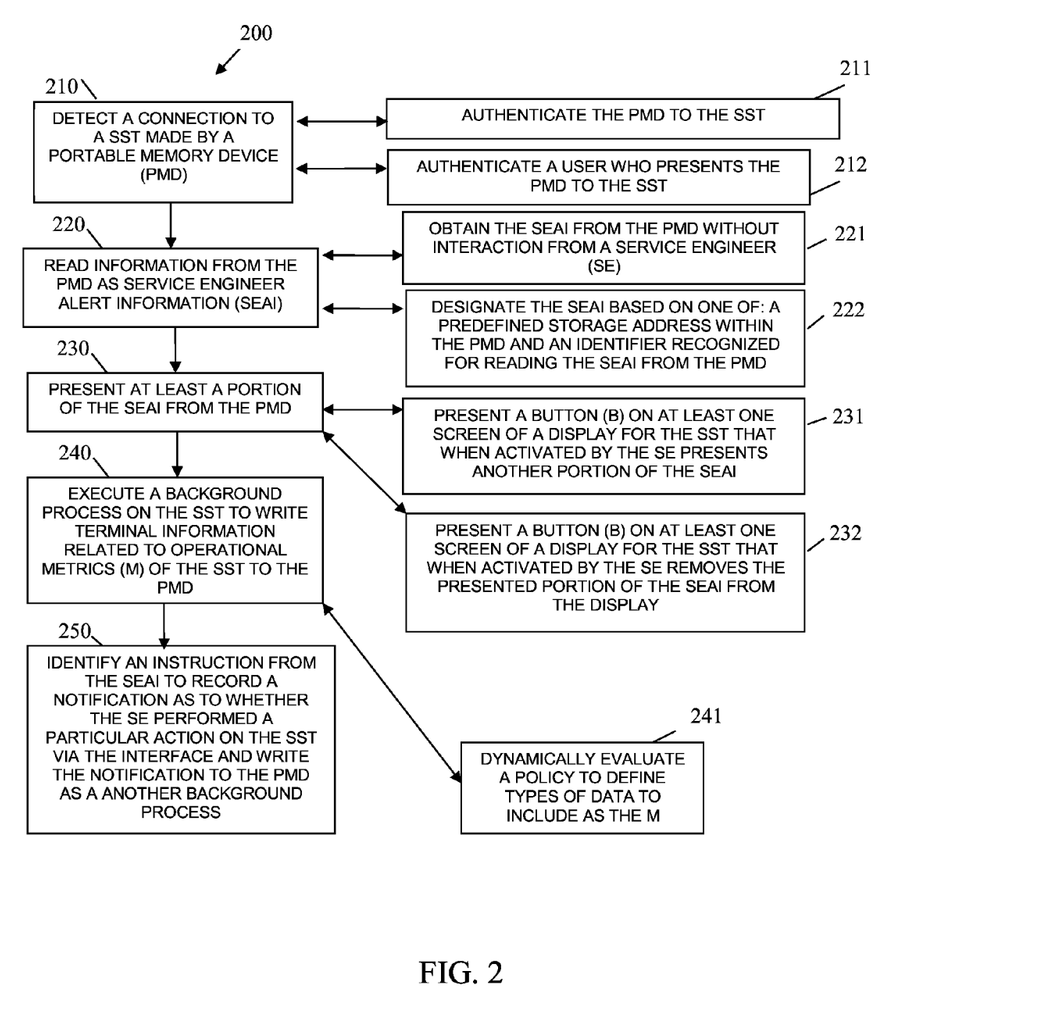
FIG. 2 is a diagram of a method for out-of-band monitoring and managing of a SST, according to an example embodiment.
Figure 3:
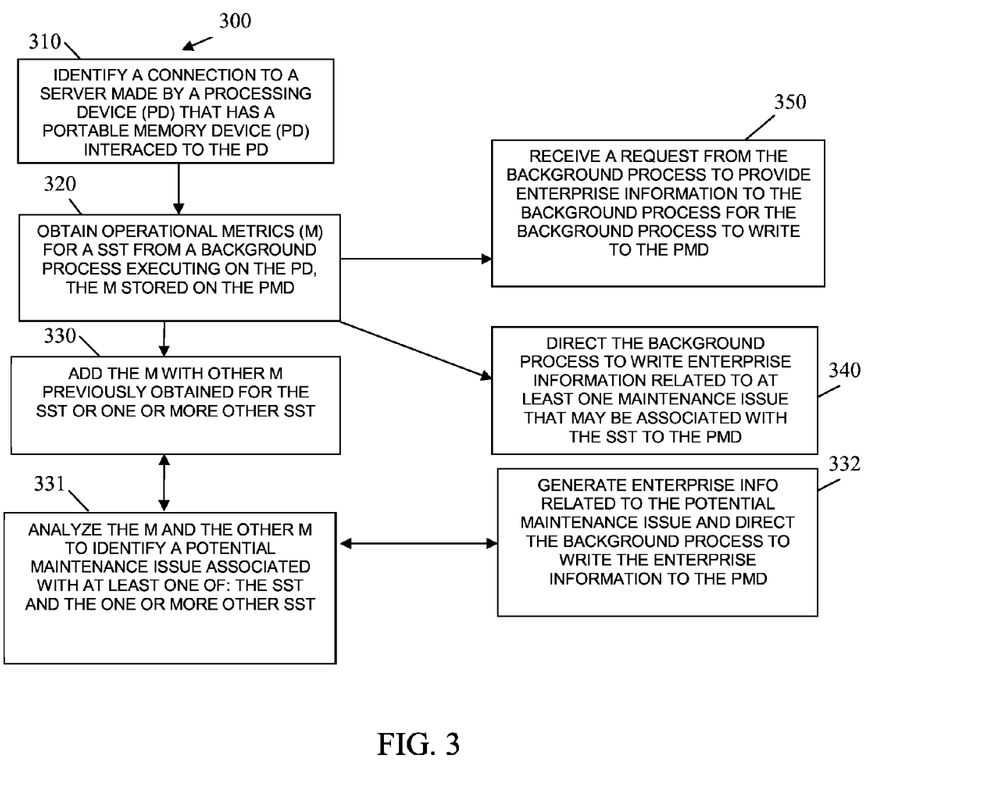
FIG. 3 is a diagram of another method for out-of-band monitoring and managing of a SST, according to an example embodiment.
Figure 4:
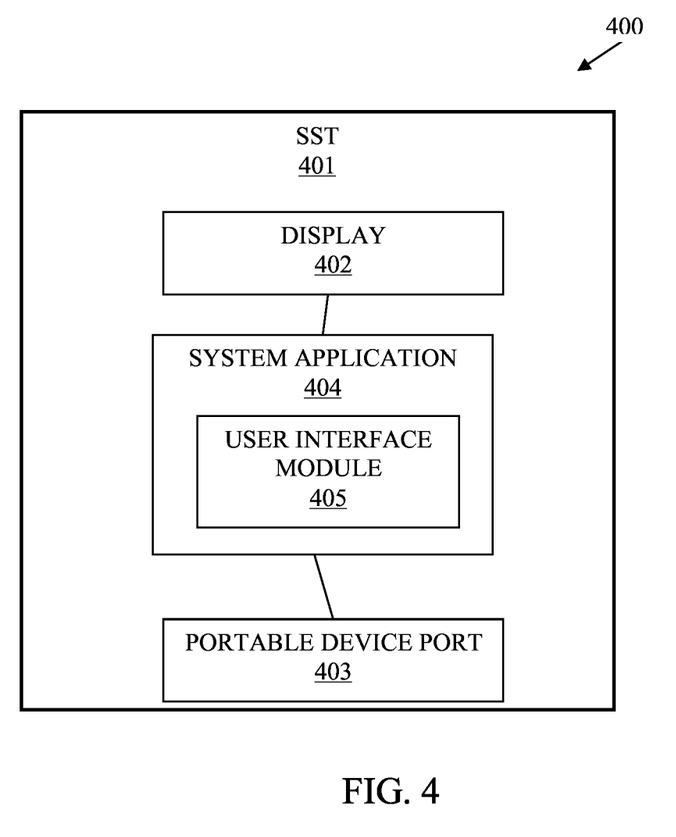
FIG. 4 is a diagram of a SST, according to an example embodiment.

Some embodiments of the architecture 100 and other embodiments of the out-of-band monitoring and managing of SSTs are now discussed with the descriptions of the FIGS. 2-4.

FIG. 2 is a diagram of a method 200 for out-of-band monitoring and managing of a SST, according to an example embodiment. The software module(s) that implements the method 200 is referred to as a "SST information manager." The SST information manager is implemented as executable instructions programmed and residing within memory and/or a non-transitory computer-readable (processor-readable) storage medium and executed by one or more processors of a device. The processors of the device that executes the SST information manager are specifically configured and programmed to process the SST information manager. The SST information manager has access to one or more networks during its processing. The networks can be wired, wireless, or a combination of wired and wireless.

In an embodiment, the device that executes the SST information manager is an ATM, such as ATM 140 presented above with respect to architecture 100 of the FIG. 1. In another embodiment, the device that processes the SST validator is a different type of kiosk. The different type of kiosk can be associated with transactions for: retail venues, government venues, entertainment venues, gaming venues, or transportation venues. In one case, the different type of kiosk is a vending machine that lacks a network connection. According to an embodiment, the SST information manager is identified as the system application 142 in the FIG. 1.

At 210, the SST information manager detects a connection to the SST, which executes the SST information manager, made by a portable memory device (such as USB dongle 110, SD card, and others). This is done in an automated manner, such that when the portable memory device is inserted into a communication or device port of the SST.

According to an embodiment, at 211, this SST information manager authenticates the portable memory device to the SST information manager and/or the SST. Typically, this is done without input of the SST information manager, via API calls between the SST and the portable memory device. One mechanism for authentication utilizing messages and a security key 111 was presented above with reference to the FIG. 1.

In some situations, at 212, the SST information manager also authenticates the user who presents (interfaces the portable memory device to a device port of the SST) the portable memory device to the SST. In an embodiment, the (interfaces the portable memory device to a device port of the SST) presents an interface (graphic or text-based interface) on a display of the SST to receive service engineer credentials and perform authentication on the service engineer.

At 220, the SST information manager information or data from the portable memory device. The information is read as service engineer alert information (discussed above with reference to the discussion of the architecture 100 of the FIG. 1, with respect to information 112B).

In an embodiment, at 221, the SST information manager obtains the service engineer alert information from the portable memory device without any action being required by a service engineer. This was described in detail above.

For example, at 222, the SST information manager designates an appropriate location on the portable memory device as having the service engineer alert information from a predefined storage address or offset address within secure storage of the portable memory device. In another case of 221, the SST information manager designates the service engineer alert information using an API of the portable memory device and passing an identifier for the service engineer alert information to the portable memory device (the identifier a handle or name for the service engineer alert information).

At 230, the SST information manager presents at least a portion of the service engineer alert information on a display of the SST.

According to an embodiment, at 231, the SST information manager presents a button on at least one screen of the display for the SST. The button when activated by the service engineer presents another portion of the service engineer alert information (not originally presented by 230). For example, more details instructions can be activated by the service engineer if the service engineer needs to know those details.

In an embodiment, at 232, the SST information manager presents a button on at least one screen of the display for the SST that when activated by the service engineer removes the presented portion of the service engineer alert information from the display of the SST.

At 240, the SST information manager executes a background process to write terminal information related to operational metrics of the SST to the portable memory device. This can be done as the service engineer interacts with the interface of the SST performing other unrelated operations on the SST. The portable memory device is subsequently interfaced to a different processing device (such as laptop personal computer 120) that utilizes an entirely different network connection to connect to a server (such as enterprise server 130) and provide the operational metrics (by interacting with enterprise system 131) for analysis without interaction of the service engineer.

In an embodiment, the operational metrics are the ATM information 112A described above with reference to the FIG. 1.

According to an embodiment, at 241, the SST information manager dynamically evaluates a policy to define types of data to include as the terminal information. So, data definitions (such as schemas) and policy (conditions with actions) can be defined in files that can be evaluated by the SST information manager to define what types of data to include as the terminal information. In this way, changes to the types of data collected by the SST information manager can be made by replacing or modifying a file having the policy and/or schema.

According to an embodiment, at 250, the SST information manager acquires enterprise information (new instance of the service alert information (identified as information 112B in the FIG. 1) related to content provided by an enterprise from the portable memory device without interaction of the service engineer. This too can be achieved via the background process or another background process. The enterprise information can be in a same file as the previously stored operational metrics was on the portable memory device (same file or same memory location) with a bit flag that when set indicates to the SST information manager that the enterprise information is available (so 112A and 112B are being used in the same locations within secure storage 113 of the FIG. 1). In another case, the enterprise information is identified by a different storage/memory location within the portable memory device from that which is associated with the previously stored operational metrics or can have a different file name (embodiment shown in the FIG. 1 where enterprise information is 112B and ATM information 112A (operational metrics) are stored in different locations within the secure storage 113).

In an embodiment, the SST information manager identifies an instruction from the enterprise information (or from a different memory location or different file on the portable memory device). The instruction directs the SST information manager to record a notification as to whether the service engineer performed a particular action on the SST, via the interface. Moreover, the SST information manager writes the notification to the portable memory device using the background process or another background process.

FIG. 3 is a diagram of another method 300 for out-of-band monitoring and managing of an SST, according to an example embodiment. The software module(s) that implements the method 300 is referred to as a "enterprise information manager." The enterprise information manager is implemented as executable instructions programmed and residing within memory and/or a non-transitory computer-readable (processor-readable) storage medium and executed by one or more processors of a device. The processors of the device that executes the enterprise information manager are specifically configured and programmed to process the enterprise information manager. The enterprise information manager has access to one or more networks during its processing. The networks can be wired, wireless, or a combination of wired and wireless.

In an embodiment, the device that executes the key distributor is a server, such as server 130 presented above with respect to architecture 100 of the FIG. 1. In an embodiment the enterprise information manager is identified as at least one portion of the enterprise system 131 in the FIG. 1.

At 310, the enterprise information manager identifies a connection to a server made by a processing device that has a portable memory device interfaced to the portable memory device. In an embodiment, the portable memory device is the portable memory device 110 of the FIG. 1 and the processing device is the laptop 120 of the FIG. 1.

At 320, the enterprise information manager obtains operational metrics for the SST (such as ATM 140 of the FIG. 1) from a background process executing on the portable memory device. The operational metrics stored on the portable memory device utilizing the techniques presented above with respect to the FIGS. 1 and 2.

According to an embodiment, at 330, the enterprise information manager adds the operational metrics with other operational metrics previously obtained for the SST or one or more other SSTs. So, a data repository of operational metrics is established by the enterprise information manager.

In one case of 330 and at 331, the enterprise information manager analyzes the operational metrics to identify a potential maintenance issue associated with the SST and/or the one or more other operational metrics. Any custom or existing data relationship application or service can be used to perform the analysis in an automated or semi-automated manner (receiving input from a data analyst). It is noted, that a data analyst can also perform manual analysis of the data repository.

In one situation of 331 and at 332, the enterprise information manager generates enterprise information related to the potential maintenance issue and directs the background process to write the enterprise information to the portable memory device. In generating the enterprise information, portions of existing enterprise information may be collected and assembled to form the enterprise information or entirely new enterprise information or some new and existing enterprise information can be produced.

In an embodiment, at 340, the enterprise information manager directs the background process to write the enterprise information related to at least one maintenance issue that may be associated with the SST to the portable memory device. This is a data push from the enterprise information manager to the portable memory device via the background process executing on the processing device (such as laptop 120).

Alternatively, at 350, the enterprise information manager receives a request from the background process to provide the enterprise information to the background process for the background process to write to the portable memory device. This is a data pull from data stores accessible to the enterprise information manager, since the data request is initiated by the processing device via the background process.

FIG. 4 is a diagram 100 of a SST 401, according to an example embodiment. The components of the SST 401 are programmed and reside within memory and/or a non-transitory computer-readable medium and execute on one or more processors of one or more devices. The SST 401 has access and can communicate over one or more networks; and the networks can be wired, wireless, or a combination of wired and wireless.

The SST 401 includes a display 402, a portable device port 403, and a system application software module 404 having a user interface software module 405.

The SST 401 has the system application software module 404 programmed within memory and/or a non-transitory computer-readable storage media as executable instructions of the SST 401.

In an embodiment, the system application software module 404 is the system application 142 of the FIG. 1.

In an embodiment, the SST 401 is an ATM, such as ATM 140. In another embodiment, the SST 401 is a different type of kiosk. In an embodiment, the SST 401 is a vending machine that lacks a network connection.

The system application software module 404 is operable to: authenticate a portable device coupled to the portable device port 403, retrieve alert information from the coupled portable device, and present the retrieved alert information on the display 402 of the SST 401. It is noted that the SST 401 can have multiple displays (one for user access and one for service engineer access); the display 402 is intended to be the display of the SST 401 that the service engineer uses for access.

In an embodiment, the portable device port 403 is the UBS device port 141 of the FIG. 1. In other cases the portable device port 403 can be any wired or wireless device port.

In an embodiment, the portable device is a USB dongle device, such as the USB key dongle 110 of the FIG. 1. In other embodiment, the portable device is a SD card. In other cases, the portable device can be any portable storage device.

According to an embodiment, the system application software module 404 includes a user interface software module 405. The user interface software module 405 operable to present the retrieved alert information on the display 402 and to present a confirmation control (such as the buttons discussed herein and above) that is operable to a service engineer to indicate that the alert information has been viewed by the service engineer.

In another case, the system application software module 404 is further operable to write information relating to operational activities of the SST 401 to the portable device port 403 for delivery and execution on the portable device.

In still another situation, the system application software module 404 is further operable to retrieve an instruction from the alert information that the system application software module 404 is to monitor to ensure that the service engineer performed a particular operation.

One now appreciates how SSTs can be monitored and managed via out-of-band techniques that utilize a portable memory device interfaced to a SST, without a network connection, to gather operational metrics, which are reported back to an enterprise for analysis during a network connection to systems of the enterprise. Moreover, proactive enterprise information that assists a service engineer to service SSTs can be provided during the network connection to the systems and provided on a display of the SST when the service engineer interfaces the portable memory device to the SST. These out-of-band monitoring and managing techniques are achieved without interaction, and in some cases knowledge, of the service engineer.

It should be appreciated that where software is described in a particular form (such as a component or module) this is merely to aid understanding and is not intended to limit how software that implements those functions may be architected or structured. For example, modules 131 and 134 are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   identifying, via a server, a connection to the server made by a processing device that has a portable memory device interfaced to the portable memory device;
   obtaining, via the server, operational metrics for a Self-Service Terminal (SST) from a background process executing on the processing device, the operational metrics stored on the portable memory device;
   adding, via the server, the operational metrics with other operational metrics previously obtained for the SST or one or more other SSTs, including analyzing the operational metrics and other operation metrics to identify a potential maintenance issue associated with at least one of the SST and the one or more other SSTs, generating enterprise information related to the potential maintenance issue, and directing the background process to write the enterprise information to the portable memory device.

2. A method, comprising:
   identifying, via a server, a connection to the server made by a processing device that has a portable memory device interfaced to the portable memory device;

obtaining, via the server, operational metrics for a Self-Service Terminal (SST) from a background process executing on the processing device, the operational metrics stored on the portable memory device; and receiving, via the server, a request from the background process to provide enterprise information to the background process to write to the portable memory device.

\* \* \* \* \*